(No Model.)  2 Sheets—Sheet 2.

W. L. MONROE.
CHURN DASHER.

No. 326,318. Patented Sept. 15, 1885.

WITNESSES
F. L. Ourand
J. J. Parker

INVENTOR
William L. Monroe
Per Jas T Drummond
*Attorney*

UNITED STATES PATENT OFFICE.

WILLIAM L. MONROE, OF OMAHA, NEBRASKA.

CHURN-DASHER.

SPECIFICATION forming part of Letters Patent No. 326,318, dated September 15, 1885.

Application filed February 9, 1885. (No model.)

*To all whom it may concern:*

Be it known that I, WILLIAM L. MONROE, a citizen of the United States, residing at Omaha, in the county of Douglas and State of Nebraska, have invented a new and useful Improvement in Churn-Dashers, of which the following is a specification.

My invention relates to an elastic wire-spring churn-dasher having an air-retaining cap combined therewith, and to the devices for attaching and fastening said wire springs to a churn-dasher handle. Said dasher is used reciprocally in an upright cylindrical churn.

The object of my invention is to provide an elastic churn-dasher having improved facilities for violently agitating cream and distributing air through it during the process of churning as a means of more easily and speedily separating the particles of butter or fatty matter from the caseine of milk than has hitherto been known.

I am aware that conical coiled wire springs, used singly, have been attached to handles and used as egg-beaters and to the under side of churn-dashers as a means of giving elasticity thereto, and to assist in giving action to other parts of churn-dashers and egg-beaters in different forms, and that concentric circles of wire have been placed on radial-arm churn-dashers as a means of assisting in agitating cream by reciprocal motions of the dasher.

My invention consists of two conical spiral springs coiled or wound in opposite directions the one from the other, one of which being smaller in its diametrical proportions, and made to fit and work one inside of the other, with their apex securely fastened to one handle, in combination with a cap having its under surface concave, which is attached to said handle at or near the apex of said springs in such manner that a downward movement of said dasher will carry with it the air contained in said concavity of the cap, thereby providing an elastic air-cushion for softening the stroke against the cream, which prevents injury to the grain of butter, otherwise caused by sudden dashes of a solid substance, which concavity also serves to carry said air contained therein downward, so as to distribute it through the cream as auxiliary to the churning process.

I will proceed to give a more minute description of my invention by aid of the accompanying illustrative drawings, which constitute part of this specification, of which—

Figure 1:
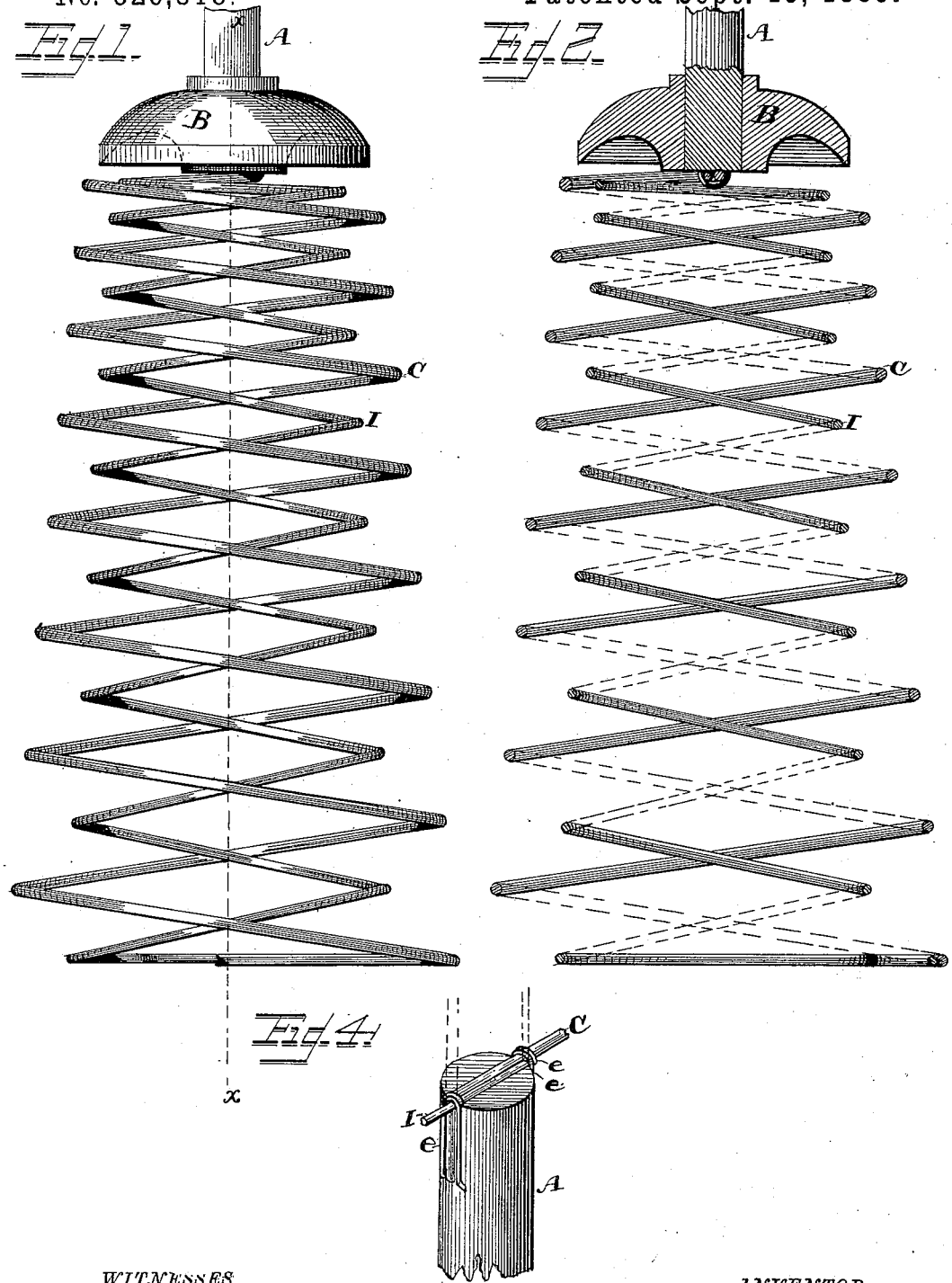
Figure 2:
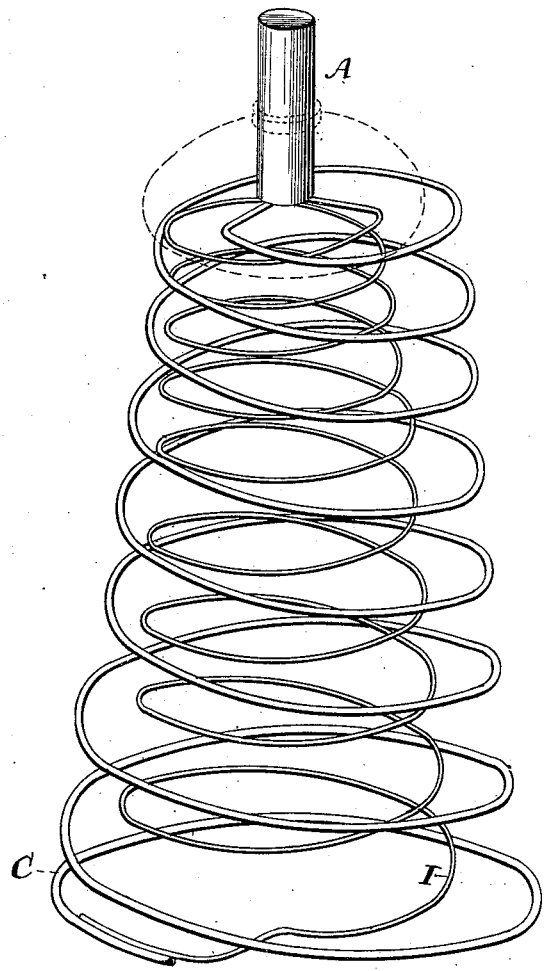

Figure 1 is a side elevation of the whole device embodying my invention. Fig. 2 is a vertical section of the same, as shown at the dotted line $x\ x$ in Fig. 1. Fig. 3 is a perspective of the spiral springs and part of the lower end of the dasher-handle, showing also by dotted lines the position of the cap. Fig. 4 is a perspective view of part of the lower end of the handle in an inverted position, showing the manner of attaching and the fastening devices for the springs to the handle.

Similar letters of reference indicate like parts in the different figures and the dotted lines in Fig. 2, the detached portions of the wires forming the two reversely-coiled spiral springs.

A represents a stub of the lower end of the dasher-handle, it being of ordinary shape and dimensions.

B is the cap of the dasher, the dotted lines in Fig. 1 showing sections of a circular concavity formed in its under side, for the purpose described.

C represents the outer coiled spiral spring, and I the inner one, said springs being wound in opposite directions, so that they will have free action without becoming interlocked with each other, and they serve to raise the handle A and cap B after having been depressed by the operator, thereby largely diminishing the labor of churning, the combined action of said springs being also very efficient in aiding the churning process by breaking the butter-globules of cream, and thus separating the butter from the caseine of the milk. Said springs may be made of either round, square, flat, or other shaped wire, as may be most desirable for convenience and best suited for the accomplishment of the objects sought.

e in Fig. 4 represents anchors or holders for fastening said springs to the dasher-handle.

The upper extremity of the springs C and I, being bent in proper shape, have their points inserted into the handle on opposite sides, with the rectangular bends of said springs laid so as to be parallel with the sides of said handle, and beside of and parallel with each other across its lower end, as above suggested and as shown, each respectively starting from and terminating at different sides of said handle. The anchors or holders e, being properly bent at one end, are driven into the handle A, with the loose ends extending beyond the end of the handle, as represented by dotted lines, and one on either side of the shanks of the springs C and I, respectively. The extended loose ends are then bent and tightly closed over said shanks. After thus arranging said parts the cap B is slipped down on the handle over said attachments and fastenings.

Having thus fully described my invention, so as to enable others skilled in the art to which it appertains, what I claim as new, and desire to secure by Letters Patent, is—

1. The combination of the springs C and I, cap B, and handle A, all formed and arranged substantially as shown, for the purposes specified.

2. In combination with the handle A and springs C and I, bent and arranged as shown, the holders e and cap B, substantially as shown, for the purposes specified.

WILLIAM L. MONROE.

Witnesses:
JOHN T. BELL,
W. G. SHRIVER.